United States Patent
Anand et al.

(10) Patent No.: US 12,306,632 B2
(45) Date of Patent: May 20, 2025

(54) METHOD AND SYSTEM FOR SEMANTIC NAVIGATION USING SPATIAL GRAPH AND TRAJECTORY HISTORY

(71) Applicant: Tata Consultancy Services Limited, Mumbai (IN)

(72) Inventors: Kritika Anand, Hyderabad (IN); Snehasis Banerjee, Kolkata (IN); Brojeshwar Bhowmick, Kolkata (IN); Madhava Krishna Krishnan, Hyderabad (IN); Gulshan Kumar, Hyderabad (IN); Sai Shankar Narasimhan, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 249 days.

(21) Appl. No.: 18/172,663

(22) Filed: Feb. 22, 2023

(65) Prior Publication Data
US 2023/0266766 A1   Aug. 24, 2023

(30) Foreign Application Priority Data

Feb. 23, 2022  (IN) .............................. 202221009498

(51) Int. Cl.
*G05D 1/00*   (2024.01)
*G05D 1/02*   (2020.01)

(52) U.S. Cl.
CPC ......... *G05D 1/0217* (2013.01); *G05D 1/0088* (2013.01); *G05D 1/0246* (2013.01)

(58) Field of Classification Search
CPC .. G05D 1/0217; G05D 1/0088; G05D 1/0246; G05D 1/0274; G01C 21/206
See application file for complete search history.

(56) References Cited

U.S. PATENT DOCUMENTS

| | | | | |
|---|---|---|---|---|
| 2020/0198140 A1* | 6/2020 | Dupuis | ................... | G01C 21/20 |
| 2022/0197288 A1* | 6/2022 | Zhao | .................... | G05D 1/0212 |
| 2022/0198813 A1* | 6/2022 | Chiu | ..................... | G06V 10/82 |

FOREIGN PATENT DOCUMENTS

CN         114061586 A  *  2/2022  ........... G01C 21/206

OTHER PUBLICATIONS

"Xiu-Shen, et.al., 'Fine Grained Image Analysis with Deep Learning', 2021" (Year: 2021).*

(Continued)

*Primary Examiner* — Sahar Motazedi
(74) *Attorney, Agent, or Firm* — Finnegan, Henderson, Farabow, Garrett & Dunner, LLP

(57) ABSTRACT

A model for semantic navigation for service robots to find out-of-view objects in an indoor environment is provided. Initially, the system receives a target object to be reached by the mobile robot in the indoor environment. Further, a current location of the mobile robot is identified by a localization technique. An embedding corresponding to each of a plurality of visible regions is computed using a pretrained Graph Neural Network GNN. The GNN is pretrained using a trajectory data and a spatial relationship graph associated with the indoor environment. Further, a similarity score is computed for each of the plurality of visible regions based on the corresponding embedding using a scoring technique. An optimal visible region is identified by comparing the similarity score. Finally, a next action to be taken by the mobile robot selected from a plurality of actions based on the optimal visible region.

9 Claims, 5 Drawing Sheets

(56) References Cited

OTHER PUBLICATIONS

Machine Translation of CN-114061586-A (Year: 2022).*
"Yi, L., et.al., 'MGRL: Graph neural network based inference in a Markov network', 2021" (Year: 2021).*
Lv, Yunlian et al., "Improving Target-driven Visual Navigation with Attention on 3D Spatial Relationships", Machine Learning, Date: Apr. 2020, Publisher: Arxiv, https://arxiv.org/pdf/2005.02153.pdf.
Tsai Cheng Yu et al., "VSGM—Enhance robot task understanding ability through visual semantic graph", Computer Vision and Pattern Recognition, Date: Mar. 2021, Publisher: Arxiv, https://arxiv.org/pdf/2105.08959.pdf.
Kwon, Obin et al., "Visual Graph Memory with Unsupervised Representation for Visual Navigation", CVF International Conference on Computer Vision (ICCV), Date: 2021, pp. 15870-15879, Publisher: IEEE, https://openaccess.thecvf.com/content/ICCV2021/papers/Kwon_Visual_Graph_Memory_With_Unsupervised_Representation_for_Visual_Navigation_ICCV_2021_paper.pdf.
Chen, Kevin et al., "A Behavioral Approach to Visual Navigation with Graph Localization Networks", Robotics, Date: Mar. 2019, Publisher: Arxiv, https://arxiv.org/pdf/1903.00445.pdf.

* cited by examiner

METHOD AND SYSTEM FOR SEMANTIC NAVIGATION USING SPATIAL GRAPH AND TRAJECTORY HISTORY

PRIORITY CLAIM

The present application claims priority from Indian provisional patent application no. 202221009498, filed on Feb. 23, 2022. The entire contents of the aforementioned application are incorporated herein by reference.

TECHNICAL FIELD

The disclosure herein generally relates to the field of robotics and, more particularly, to a method and system for semantic navigation using spatial graph and trajectory history.

BACKGROUND

Navigation is one of the principal tasks of an embodied Artificial Intelligence (AI) agent (robots). The navigation is classified into several types such as "Point Goal" navigation, an "Object Goal" navigation, and an "Area Goal" navigation. In "Point Goal" navigation, the robot needs to move from one point to another. In "Object Goal" navigation, the robot needs to move to a semantically distinct object instance. In "Area Goal" navigation, the robot needs to move to a semantically distinct area. The different types of navigations are applicable to different types of applications and the "Object Goal" navigation is used in service robots in indoor settings. For example, the robot can be asked to go to a particular destination like 'sink'. To achieve this task, the robot needs to navigate from a current location to the target location.

Conventional semantic navigation methods are based on either Graph Neural Networks (GNNs) or Bayesian Relational Memory (BRM). The GNNs based methods embed prior knowledge into a Deep Reinforcement Learning framework and is based on Actor-Critic model, where an actor decides which action is to be taken and a critic informs the actor how good was the action. The BRM work introduces an architecture to improve the generalization ability for semantic visual navigation agents in unseen environments. However, the conventional GNNs based model lacked a concrete decision model when two or more objects are in same scene. The BRM model required a preset layout and priors based on scenes instead of object-object relations, which is not available most of the time. Hence there is a challenge in developing a model for semantic navigation for service robots to find out-of-view objects in an indoor environment having multiple instances of objects.

SUMMARY

Embodiments of the present disclosure present technological improvements as solutions to one or more of the above-mentioned technical problems recognized by the inventors in conventional systems. For example, in one embodiment, a method for semantic navigation using spatial graph and trajectory history is provided. The method includes receiving by one or more hardware processors, a target object to be reached by a mobile robot in an indoor environment. The indoor environment comprises a plurality of regions, wherein each of the plurality of regions is associated with a plurality of objects. Further, the method includes iteratively performing the following operations till the mobile robot reaches the target: (i) identifying, by the one or more hardware processors, a current location of the mobile robot based on a plurality of visible regions around the mobile robot using a localization technique (ii) computing, by the one or more hardware processors, an embedding corresponding to each of the plurality of visible regions based on the current location of the mobile robot, and a plurality of valid trajectory paths of the mobile robot and the target object, using a pretrained Graph Network (GNN), wherein the GNN is pretrained using a trajectory data and a spatial relationship graph associated with the indoor environment (ii) computing, by the one or more hardware processors, a similarity score for each of the plurality of visible regions based on a corresponding embedding, using a scoring technique (iii) identifying, by the one or more hardware processors, an optimal visible region from the plurality of visible regions by comparing the similarity score corresponding to each of the plurality of visible regions, wherein the visible region with a maximum similarity score from among the plurality of visible regions is identified as the optimal visible region and (iv) selecting, by the one or more hardware processors, a next action to be taken by the mobile robot from a plurality of actions based on the optimal visible region.

In another aspect, a system for semantic navigation using spatial graph and trajectory history is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a target object to be reached by a mobile robot in an indoor environment. The indoor environment comprises a plurality of regions, wherein each of the plurality of regions is associated with a plurality of objects. Further, the one or more hardware processors are configured by the programmed instructions to iteratively performing the following operations till the mobile robot reaches the target: (i) identifying, by the one or more hardware processors, a current location of the mobile robot based on a plurality of visible regions around the mobile robot using a localization technique (ii) computing, by the one or more hardware processors, an embedding corresponding to each of the plurality of visible regions based on the current location of the mobile robot, and a plurality of valid trajectory paths of the mobile robot and the target object, using a pretrained Graph Network (GNN), wherein the GNN is pretrained using a trajectory data and a spatial relationship graph associated with the indoor environment (ii) computing, by the one or more hardware processors, a similarity score for each of the plurality of visible regions based on a corresponding embedding, using a scoring technique (iii) identifying, by the one or more hardware processors, an optimal visible region from the plurality of visible regions by comparing the similarity score corresponding to each of the plurality of visible regions, wherein the visible region with a maximum similarity score from among the plurality of visible regions is identified as the optimal visible region and (iv) selecting, by the one or more hardware processors, a next action to be taken by the mobile robot from a plurality of actions based on the optimal visible region.

In yet another aspect, a computer program product including a non-transitory computer-readable medium having embodied therein a computer program for semantic navigation using spatial graph and trajectory history is provided. The computer readable program, when executed on a computing device, causes the computing device to receive a target object to be reached by a mobile robot in an indoor environment. The indoor environment comprises a plurality of regions, wherein each of the plurality of regions is associated with a plurality of objects. Further, The computer readable program, when executed on a computing device, causes the computing device to iteratively perform the following operations till the mobile robot reaches the target: (i) identifying, by the one or more hardware processors, a current location of the mobile robot based on a plurality of visible regions around the mobile robot using a localization technique (ii) computing, by the one or more hardware processors, an embedding corresponding to each of the plurality of visible regions based on the current location of the mobile robot, and a plurality of valid trajectory paths of the mobile robot and the target object, using a pretrained Graph Network (GNN), wherein the GNN is pretrained using a trajectory data and a spatial relationship graph associated with the indoor environment (ii) computing, by the one or more hardware processors, a similarity score for each of the plurality of visible regions based on a corresponding embedding, using a scoring technique (iii) identifying, by the one or more hardware processors, an optimal visible region from the plurality of visible regions by comparing the similarity score corresponding to each of the plurality of visible regions, wherein the visible region with a maximum similarity score from among the plurality of visible regions is identified as the optimal visible region and (iv) selecting, by the one or more hardware processors, a next action to be taken by the mobile robot from a plurality of actions based on the optimal visible region.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
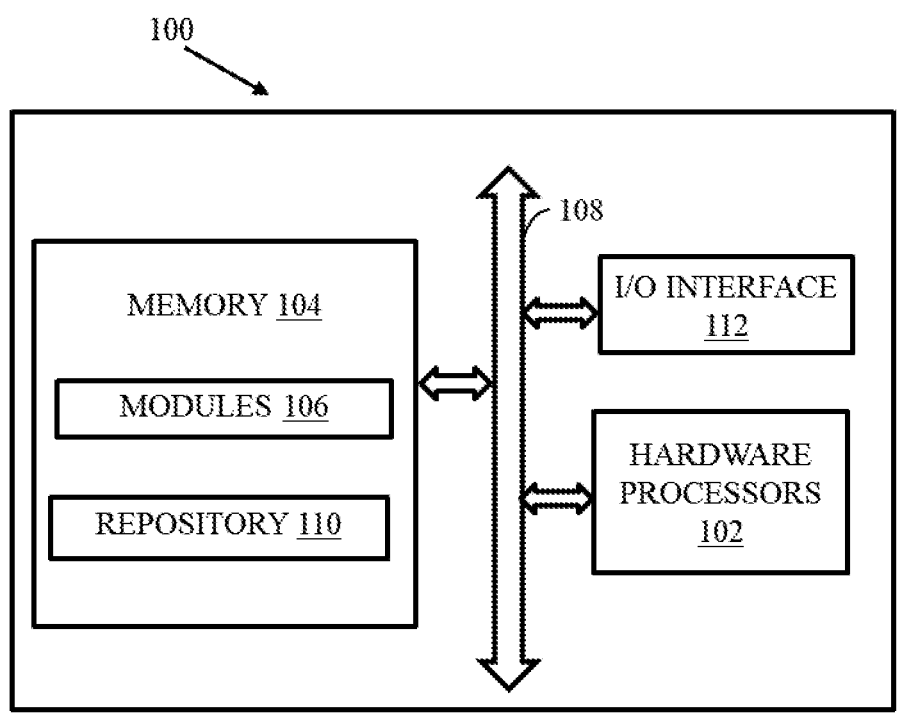
FIG. 1 is a functional block diagram of an onboard system connected to a mobile robot for semantic navigation using spatial graph and trajectory history, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Semantic object-goal navigation enables a mobile robot to traverse to a target object based on a richer understanding of a plurality of scenes associated with an indoor environment. However, reaching out to a target object which is out-of-view to the mobile robot is a challenging task.

Embodiments herein provide a method and system for semantic navigation using spatial graph and trajectory history. The present disclosure provides a semantic navigation method for service robots to find out-of-view objects in an indoor environment. Initially, the system receives a target object to be reached by the mobile robot in the indoor environment. The indoor environment includes a plurality of regions, wherein each of the plurality of regions is associated with a plurality of objects with one or more instances. Further, a current location of the mobile robot is identified based on a plurality of visible regions around the mobile robot using a localization technique. An embedding corresponding to each of the plurality of visible regions is computed based on the current location of the mobile robot, a plurality of valid trajectory paths of the robot and the target object using a pretrained Graph Neural Network (GNN). The GNN is pretrained using a trajectory data and a spatial relationship graph associated with the indoor environment. Further, a similarity score is computed for each of the plurality of visible regions based on the corresponding embedding using a scoring technique. An optimal visible region is identified from the plurality of visible regions by comparing the similarity score corresponding to each of the plurality of visible regions. The visible region with maximum similarity score is identified as the optimal visible region. Finally, a next action to be taken by the mobile robot is selected from a plurality of actions based on the optimal visible region.

For example, the mobile robot is initialized at a random position in an unknown indoor environment and is asked to find the nearest goal object instance by exploration. At every step, the mobile robot has to choose the next action a∈A, from set of actions A={'Stop', 'Move_Forward', 'Turn_Left', 'Turn_Right', 'look_Down'}. An episode is considered a "success", if the mobile robot is within 1.0 meter Euclidean distance from any instance of the target object (goal).

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 is a functional block diagram of an onboard system connected to a mobile robot for semantic navigation using spatial graph and trajectory history, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases. For example, other devices may comprise a plurality of sensors and a plurality of cameras The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 5:
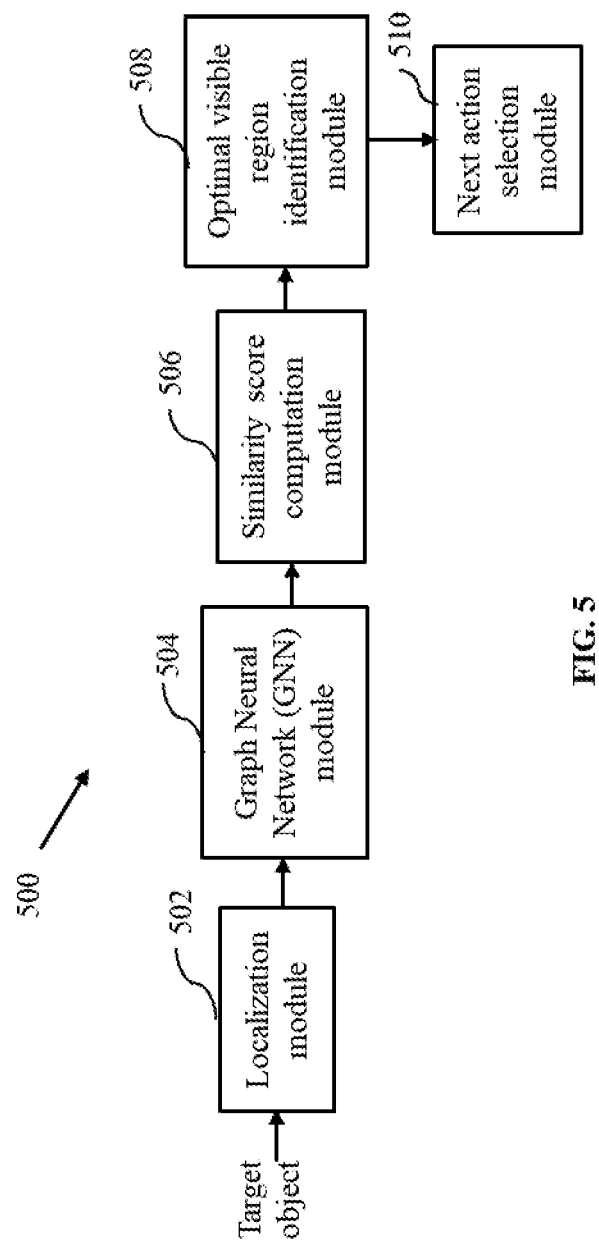
FIG. 5 is an overall functional architecture for the processor implemented method for semantic navigation using spatial graph and trajectory history, implemented by the system of FIG. 1, in accordance with some embodiments of the present disclosure.

The plurality of modules 106 include programs or coded instructions that supplement applications or functions performed by the system 100 for semantic navigation using spatial graph and trajectory history. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the semantic navigation using spatial graph and trajectory history. In an embodiment, the plurality of modules 106 includes a localization module (shown in FIG. 5), a GNN module (shown in FIG. 5), a similarity score computation module (shown in FIG. 5), an optimal visible region identification module (shown in FIG. 5) and a next action selection module (shown in FIG. 5). In an embodiment, FIG. 5 is illustrating an overall functional architecture for the processor implemented method for semantic navigation using spatial graph and trajectory history, implemented by the system of FIG. 1, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS).

Figure 2:
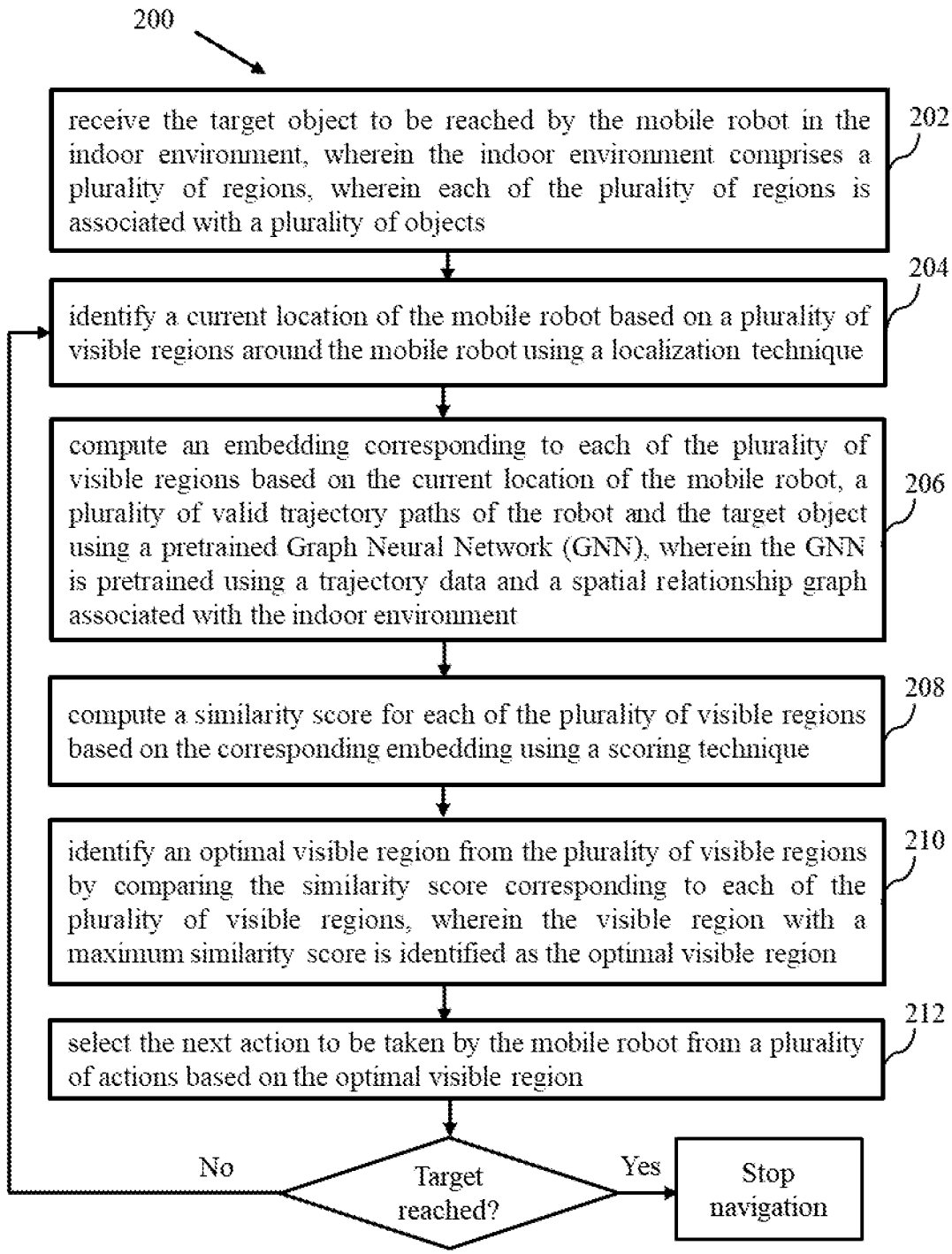
FIG. 2 is an exemplary flow diagram illustrating a method for semantic navigation using spatial graph and trajectory history, implemented by the system of FIG. 1, in accordance with some embodiments of the present disclosure.

FIG. 2 is an exemplary flow diagram illustrating a method 200 for semantic navigation using spatial graph and trajectory history implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 are configured by the programmed instructions to receive the target object to be reached by the mobile robot in the indoor environment. The "mobile robot" is alternatively called as an "agent" throughout the document. The indoor environment includes a plurality of regions (for example, "living room", "kitchen", "laundry room") and each of the plurality of regions is associated with a plurality of objects. For example, the plurality of objects in the "living room" region includes "sofa", "tv monitor" and the like. The plurality of objects includes one or more instances. For example, considering an object "sink", the "sink" can be available in the regions "sink in kitchen", "sink in laundry room" and "sink in bathroom".

At step 204 of the method 200, the localization module 502 executed by the one or more hardware processors 102 is configured by the programmed instructions to identify a current location of the mobile robot based on the plurality of visible regions around the mobile robot using the localization technique. In an embodiment, the plurality of visible regions around the mobile robot are identified using Artificial Intelligence (AI) Habitat simulator. The localization can also be performed using similar other techniques.

In an embodiment, visible regions are the regions which are visible to the mobile robot at a particular point of time. For example, if the mobile robot is standing in a "living room", the visible region is "living room" and "dining room".

In an embodiment, if the mobile robot is in "bedroom" the mobile robot identifies its current location based on the output from the AI habitat simulator. The AI Habitat simulator provides the plurality of visible region (for example, bedroom) and the plurality of objects associated with "bedroom" ("bed", "cupboard"). The mobile robot identifies its current location as "bedroom" since it has identified the object "bed" in the corresponding plurality of objects.

At step 206 of the method 200, the GNN module 504 executed by the one or more hardware processors 102 is configured by the programmed instructions to compute an embedding corresponding to each of the plurality of visible regions based on the current location of the mobile robot, a plurality of valid trajectory paths of the robot and the target object using a pretrained GNN, wherein the GNN is pretrained using a trajectory data and a spatial relationship graph associated with the indoor environment.

Figure 3:
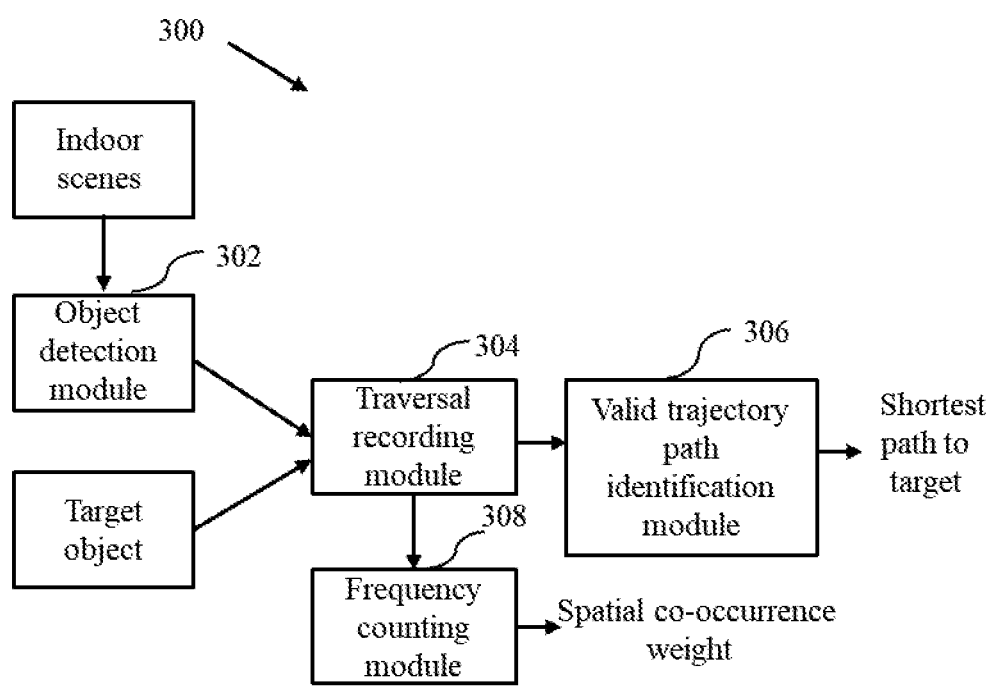
FIG. 3 illustrates a functional architecture of the system of FIG. 1, for identifying a valid trajectory path, in accordance with some embodiments of the present disclosure.

The GNN is a class of neural networks for processing data represented by a graph data structures. In an embodiment, the GNN is trained using the trajectory data and the spatial relationship graph as follows. Initially, a plurality of Matterport 3D (MP3D) scenes associated with the indoor environment are received. Each of the plurality of MP3D scenes includes the plurality of regions and the plurality of objects corresponding to each of the plurality of regions. Each of the plurality of objects are associated with the plurality of instances. Further, a plurality of trajectory paths are generated between each of the plurality of regions and each of the plurality of objects corresponding to each of the plurality of regions based on planned traversals of the mobile robot. Post generating the plurality of trajectory paths, a plurality of valid trajectory paths are generated by identifying a plurality of shortest trajectory paths from the plurality of trajectory paths as shown in FIG. 3. The plurality of trajectory paths with minimum distance are called as the plurality of valid trajectory paths. For example, if the target object category is 'sink' and the mobile robot is initialized in the region "bedroom". The are many instances of sink present in the entire MP3D house/scene such as: (sink in bathroom, sink in laundry room, sink in kitchen, etc.). The nearest sink to the bedroom will be sink linked with bathroom. The agent traverses to all the instances of the object category as the environment is known to the agent. The agent keeps the record of the regions it encounters in the traversed path. The path with the minimum distance to the target object is called the valid trajectory path and is stored. After generating the valid trajectory path, the spatial relationship graph including a plurality of nodes and a plurality of edges is generated based on the spatial co-occurrence statistics data of the plurality of regions and the corresponding plurality of objects. Finally, the GNN is trained based on the spatial relationship graph and the plurality of valid trajectory paths until a minimum cross entropy loss is obtained. For example, the goal is to train node embeddings of the GNN by optimizing the cross-entropy loss function, such that the plurality of nodes in the valid trajectory path have high similarity. That is, the main aim is to optimize the embedding structure of the GNN such that regions in the trajectory path sequence have maximum possibility of co-occurrence.

In an embodiment, a 3 layered GNN is used for training. The GNN receives input feature for every node i represented as N×D feature matrix (N: number of nodes, D: number of input features) and the spatial relationship graph in the form of an adjacency matrix A. The GNN produces an output of dimension N×E where E is the embedding dimension. The region and object categorical values are mapped to integer values. The input feature to node in the graph is the one hot encoding vector i.e. all zero values except the index of the node, which is marked with a 1. This is done to avoid bias in model for handling categorical data (object classes). For example, 19 objects and 28 regions are considered in the spatial relationship graph. An example object set is O={sink, chair, table, picture, sofa, bed, plant, stool, shower, bathtub, cushion, cabinet, chest of drawers, toilet, towel, tv monitor, counter, fireplace, gym equipment}. An example region set is R={bathroom, bedroom, closet, dining room, entryway/foyer/lobby, family room/lounge, garage, hallway, library, laundry room/mudroom, kitchen, living room, meeting room/conference room, lounge, office, porch/terrace/deck, rec/game, stairs, toilet, utility room/toolroom, tv, workout/gym/exercise, outdoor, balcony, dining booth, spa/sauna}. In another embodiment, the GNN can be replaced with similar graph representation networks architectures with any optimal combination of parameters. For example, the similar graph representation network architectures includes a Graph Attention Network, a Recurrent Graph Neural Network, a Spatial Convolutional Network and a Spectral Convolutional Network.

FIG. 3 illustrates a functional architecture for a processor implemented method for identifying valid trajectory path, in accordance with some embodiments of the present disclosure. Now referring to FIG. 3, the functional architecture includes a plurality of modules including an object detection module 302, a traversal recording module 304, a valid trajectory path identification module 306 and a frequency counting module 308. The object detection module 302 identifies the plurality of objects in each of the plurality of regions associated with the plurality of MP3D scenes. The traversal recording module 304 records each traversal of the mobile robot. For example, post initialization of the mobile robot/agent, the given goal is to find the nearest instance of an object category (alternately referred to as 'goal target object'). The agent traverses to all the instances of the object category as the environment is known to the agent. The agent keeps the record of the regions it encounters in the traversed path. In an embodiment, AI Habitat Sim, a flexible, high-performance 3D simulator, is used for rendering indoor scenes from MP3D. To get to the goal target object, the robot finds the next action using the Shortest Path Follower which takes into consideration the geodesic shortest path from the agent's current position to the goal position. The trajectory path consists of the regions it travelled to reach the target object. If the agent is in 'living room' and the target considered is 'sink', the valid trajectory path may look like {living room, hallway, dining room, kitchen}→sink, if nearest 'sink' to the 'living room' is the 'sink' associated with 'kitchen'. For example, 18,488 trajectory paths are obtained from 12 MP3D scene groups in AI Habitat—these are used in path selection later in testing stage.

The valid trajectory path identification module 306 identifies the trajectory path with minimum distance from the plurality of trajectory paths. The path with the minimum distance to the target object is called the valid trajectory path and is stored. For instance, the target object category is 'sink' and the agent is initialized in the region 'bedroom'. There can be many instances of sink present in the entire MP3D house/scene such as: (sink in bathroom, sink in laundry room, sink in kitchen, etc.). The nearest sink to the bedroom will be sink linked with bathroom.

In an embodiment, while training the GNN, a prefix path $\{i_1, i_2, i_3, \ldots, i_{x-1}\}$ is found out for a valid trajectory path $\{i_1, i_2, i_3, \ldots, i_n\} \rightarrow i_{target}$, at every index $x \in \{2, 3, \ldots n-1\}$ in the trajectory path. The path from the starting region to the current position (region) is the prefix path. In the loss function, the embedding of $i_x$ is maximized with the embeddings of in, with each node in its prefix path. For example, if the mobile robot has taken the path {living room, hallway, bedroom}→bed to reach the nearest target i.e. "bed" from its starting region i.e. "living room", the similarity of embeddings of nodes hallway with bedroom and hallway with living room are maximized. A plurality of corresponding invalid prefix paths with intermediate nodes as $i_{invalid}=R-i_{valid}$ are generated for all valid trajectory paths. For example, the prefix paths which do not lead to the target are marked as invalid prefix paths. For example, for prefix path pi: {living room, hallway, bedroom}, the invalid prefix path corresponding to pi will be {living room, x, bedroom}, where $x \in i_{invalid}$ are {living room, bathroom, bedroom}, {living room, dining room, bedroom}, . . . , {living room, stairs, bedroom}. Similarly, the similarity of embedding of node $i_j$ with embedding of $i_{target}$ of an invalid prefix path $P_{invalid}=\{i_1, i_2, i_3, \ldots, i_{X-1}\}$, at every index $j \in \{2, 3, \ldots x-1\}$ in the trajectory path is minimized. This aids in suitable path selection when a scene is processed, based on most similar valid trajectory path among the choices in the trained model.

The frequency counting module 308 counts the frequency of occurrence of each of the plurality of objects in each of the plurality of regions during traversal.

Figure 4:
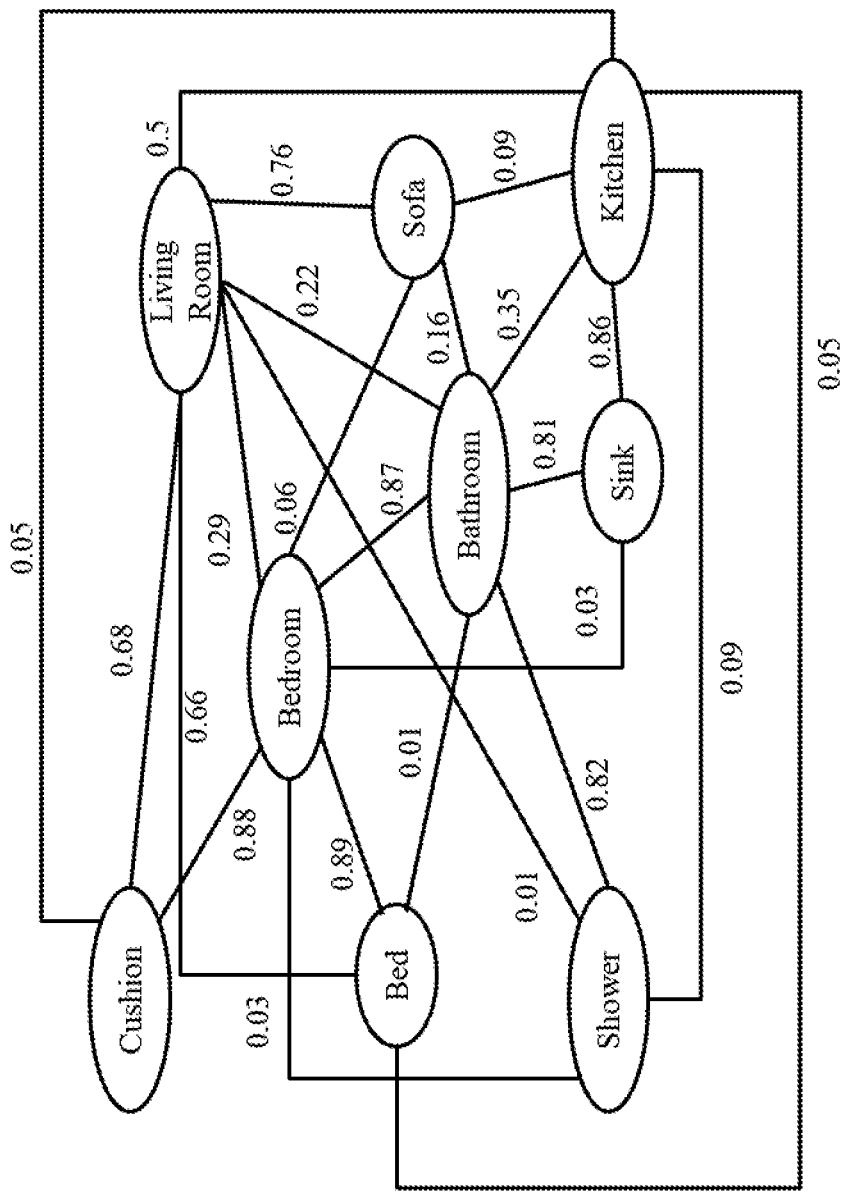
FIG. 4 is a spatial relationship graph for the processor implemented method for semantic navigation using spatial graph and trajectory history, implemented by the system of FIG. 1, in accordance with some embodiments of the present disclosure.

FIG. 4 is a spatial relationship graph for the processor implemented method for semantic navigation using spatial graph and trajectory history implemented by the system of FIG. 1, in accordance with some embodiments of the present disclosure. Now referring to FIG. 4, the spatial relationship graph includes the plurality of nodes such as but not limited to cushion, Living Room, Bedroom, Bed, Bathroom, Sofa, Shower, Sink and Kitchen. Each of the plurality of node is either an object or a region. For example, "Bedroom" is the region and "Bed" is an object in the region "Bedroom". Each of the plurality of nodes are connected using the corresponding edge and each edge is associated with a spatial cooccurrence weight.

In an embodiment, the spatial relationship graph is represented by G=(V,E), where V denote the nodes and E denotes the edges between nodes, respectively. Each node n E V denotes an object category (object node) or the region category (region node), and each edge $e \in E$ denotes the relationship between region categories or the relationship between the region and object category. For example, the plurality of edges is of two types. The edge between the region and object category is of type "includes" and the type of edge between a pair of regions is of type "adjacent/proximity".

In an embodiment, the plurality of edges of the spatial relationship graph are created as follows: For example, a mobile robot is allowed to traverse from region $R_i$ to all other regions $R_j$ in a known MP3D scene with n regions (i,j $\in R_1, R_2, R_3, \ldots, R_n$, i≠j). For each scene, an edge is created between two region nodes ($nR_k, nR_l$) if nodes representing regions $R_k$ and $R_l$ are adjacent in the path existing between $R_i$ and $R_j$. Also, an edge is created between object node ($n_0$) and region node ($nR_i$) if the object o is present in region $R_i$. A plurality of scene graphs ($G_1, G_2, G_3, \ldots, G_m$ $\in G$) are created for all m scenes in the MP3D dataset. The graphs from G are collectively used to build the spatial relational graph ($G_s$) as depicted in FIG. 4.

The 'spatial co-occurrence weight' associated with each of the plurality of edges between the nodes. The spatial co-occurrence weight is computed based on the frequency statistics. The spatial co-occurrence weight has been captured in the individual graphs corresponding to the MP3D scenes ($G_1, G_2, G_3, \ldots, G_m \in G$). For example, the spatial co-occurrence weight gives an estimate of the likelihood of the cooccurrence of two regions or an inclusion of an object within the region. In an embodiment, to estimate spatial co-occurrence weight of edge connecting object node "bed" region node "bedroom" in FIG. 4, the frequency of the object "bed" in the region "bedroom" is identified in G and further normalized by the frequency of the region "bedroom". In an embodiment, to estimate spatial co-occurrence weight of edge connecting two region nodes $r_i$ and $r_j$ for example "bedroom" and "Living Room" in FIG. 4, a total number of occurrences of $r_i$ adjacent to $r_j$ is obtained and is divided by the minimum of (frequency ($r_i$), frequency ($r_j$)) in the graph set G.

Now referring to FIG. 4, the spatial relationship graph has high spatial co-occurrence weight (weight) for "bed" in "bedroom" i.e weight=0.89 or "bedroom" adjacent to "bathroom" i.e weight=0.87 as compared to "bed" in "kitchen" i.e room" i.e weight=0.05 or "bathroom" adjacent to the "kitchen" i.e weight=0.35. This prior will help in discovering and navigating towards the target object from the agent's current position. For example, seeing a dining table from the living room will help in finding a microwave which is usually present in the kitchen and from the knowledge that kitchen is usually adjacent to dining room as per graph G.

Now referring to FIG. 2, at step 208 of the method 200, the similarity score computation module 506 executed by the one or more hardware processors 102 is configured by the programmed instructions to compute the similarity score for each of the plurality of visible regions based on the corresponding embedding using the scoring technique. For example, cosine similarity scoring technique, or a similar scoring technique is used.

For example, when the mobile robot reaches an unknown indoor scene, it has no direct idea about where to move next given the target goal object T. The agent can see the visible objects and regions surrounding it. Based on the history of traversed regions and visible regions, the mobile robot (agent) computes the similarity score of the walk. Initially, at the start of the episode the list of history of traversed regions is empty. In the middle of the episode, let's suppose the agent has traversed $hist_{walk}$:$r_1, r_2, \ldots, r_m$ regions and is currently able to view regions V: $\{v_{r1}, v_{r2}, \ldots v_{rk}\}$. The agent then computes the similarity of embeddings of node present in V with the embedding of target object t. Also, the similarity between embedding of last node in $hist_{walk}$ and t is added to the initial result, to get the walk score as given in equation (1).

$$\text{walk\_score} = \max\{\text{cosine\_sim}(\text{embed}(t), \text{embed}(v_{ri})) + \text{cosine\_sim}(\text{embed}(t), \text{embed}(r_m))\} \quad (1)$$

At step 210 of the method 200, the optimal visible region identification module 508 executed by the one or more hardware processors 102 is configured by the programmed instructions to identify the optimal visible region from the plurality of visible regions by comparing the similarity score corresponding to each of the plurality of visible regions. The visible region with maximum similarity score is identified as the optimal visible region.

At step 212 of the method 200, the next action selection module 510 executed by the one or more hardware processors 102 is configured by the programmed instructions to select the next action to be taken by the mobile robot from the plurality of actions based on the optimal visible region. For example, the plurality of next actions are "Stop", "Move_Forward", "Turn_Left", "Turn_Right", "Look_Up", "Look_Down".

For example, after computing the similarity score for all visible regions, the agent moves towards the visible region having highest similarity score. After reaching the new region, if the agent is able to view the target object, it moves towards the target object using shortest path follower. If the target is within the range of 1 m Euclidean distance it issues a "Stop" action is selected and the episode gets over. If the target object is not present in the new region, the current region where the agent is located is added to the history of regions already present in $hist_{walk}$ Thereafter, the similarity score for the embeddings in the new walk is calculated for new set of visible regions. The whole process gets repeated if the number of steps is less than 500 and the target is not found. The motion planning can be done by off-the-shelf planners like shortest path follower and PointGoal algorithms.

In an embodiment, the present disclosure is evaluated using a plurality of metrices including a success metric, a Success weigh by Path Length (SPL) metric, a soft SPL metric and a Distance To Success (DTS) metric.

In an embodiment, the success metric is the ratio of the successful episode to total number of episodes. An episode is successful if the agent is at a distance ≤1.0 m from the target object at the end of episode.

In an embodiment, the SPL metric measures the efficiency of path taken by the agent as compared with the optimal path. This is computed using the equation (2). Here, N is the number of test episodes, $S_i$ is the binary indicator of success, $l_i$ is the length of the shortest path to the closest instance of the goal from the agent's starting position and $p_i$ is the length of the actual path traversed by the agent. SPL ranges from 0 to 1. Higher SPL indicates better model performance for the following reasons. High SPL signifies that the agent trajectory length is comparable to the shortest path from the agent's starting position to the goal. SPL also suggests that the agent has reached the closest instance of the target goal category 't' from its starting position.

$$SPL = \frac{1}{N}\sum_{i=1}^{N} S_i \frac{l_i}{\max(p_i, l_i)} \quad (2)$$

SoftSPL: One of the shortcomings of SPL is that it treats all failure episodes equally. This is addressed in the SoftSPL metric by replacing Si, the binary indicator of success, by episode_progress, a continuous indicator. This episode_progress ranges from 0 to 1 depending on how close the agent was to the goal object at episode termination. The formula for SoftSPL is given in equation 3. Here, N is the number of test episodes, $l_i$ is the length of the shortest path to the closest instance of the goal from the agent's starting position, $p_i$ is the length of the actual path traversed by agent and $d_i$ is the length of the shortest path to the goal from the agent's position at episode termination. Similar to SPL, higher SPL indicates better model performance.

$$SoftSPL = \frac{1}{N}\sum_{i=1}^{N}\left(1 - \frac{d_i}{\max(l_i, d_i)}\right)\cdot\left(\frac{l_i}{\max(p_i, l_i)}\right) \quad (3)$$

Distance to Success (DTS): It signifies the distance between the agent and the permissible distance to target for success at the end of a search episode. The formula for computing DTS is given in equation (4). Here, $\|x_T-G\|_2$ is the distance of the agent from the Goal at the end of the episode, d is the success threshold. A lower DTS value at episode termination indicates that the agent is closer to the goal category. Therefore, a lower DTS value indicates better performance.

$$DTS = \max(\|x_T-G\|_2-d, 0) \quad (4)$$

In an embodiment, the experimental setup for the present disclosure is discussed below: The house scene data from MP3D is used as benchmark in AI Habitat simulator. It includes semantic annotations of regions like 'bathroom', 'bedroom', etc. The spatial relationship graph is created based on 59 scenes of MP3D dataset. For each scene, the agent initializes at region $R_i$ and allow the agent to traverse to all other regions present in scenes using the simulator. Further, a scene graph is obtained for every house/scene of MP3D data. Two region nodes $n_{Rk}$ and $n_{Rl}$ are connected in a graph if regions $R_k$ and $R_l$ are adjacent in the scene and there exists a direct path which an agent can traverse with no intermediate regions. For instance, if garage and bedroom are adjacent in a scene but to reach garage starting from bedroom, an agent has to traverse hallway and entryway, then there is no edge connecting the nodes representing regions garage and bedroom. Also, for each region, the objects present in region are connected with the node corresponding to that region. From the 59 scene graphs, the spatial relational graph is constructed. The present disclosure utilizes NetworkX, a Python package for graph creation, manipulation and implementation to represent the spatial information present in MP3D scenes.

Further the GNN is trained on 12 MP3D scenes and the performance is evaluated for 1500 episodes (6 Matterport3d scenes, 250 episodes for each scene). Here, a 3-layer GNN is used which takes i) Spatial relational graph as input graph and ii) one hot encoding vector of region and object nodes as input feature. 18,488 valid trajectories are obtained and are used to train the GNN. Sigmoid Cross Entropy loss is used to learn embeddings for region and object nodes. Adam optimizer with a learning rate of 0.0003 is used to update network weights iteratively based on trajectory data. GNN Conv operator is used for the 3 convolutional layers. The reason for choosing GNN Cony operator is that it learns hidden layer representations that encode both local graph structure and features of nodes. Also, it scales linearly with increase in edges in the graph. The present disclosure utilizes PyTorch Geometric which is a deep learning library for PyTorch to work with GNN.

The performance of the present disclosure is evaluated using the Success, SPL and DTS metrices. The quantitative results of Object Navigation using the present disclosure is compared with the state of the art methods and found the performance is better than the conventional methods.

In an embodiment, in order to understand the contribution of the spatial relation statistics and valid trajectory data for GNN training in the present disclosure, some ablation studies are performed and is shown in Table I. Now referring to Table I, it is observed that the performance of the present disclosure is increases tremendously due to the utilization od spatial relationship graph and valid trajectory paths.

TABLE I

| Target | Without Spatial Relation | | With Spatial Relation | |
|---|---|---|---|---|
| Object | Success ↑ | SPL ↑ | Success ↑ | SPL ↑ |
| bed | 0.60 | 0.3484 | 0.9983 | 0.678 |
| towel | 0.4366 | 0.2075 | 0.8666 | 0.5258 |
| chair | 0.88 | 0.615 | 0.9383 | 0.696 |
| shower | 0.63 | 0.2761 | 0.875 | 0.521 |
| picture | 0.395 | 0.3576 | 0.95 | 0.7321 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of semantic navigation to empower a service robot to navigate in an indoor environment to find out-of-view objects. The approach incorporates spatial relational knowledge of objects and regions in indoor setting, combined with valid trajectory data priors from known scenes. The efficiency of the method is proven against baseline metrics in similar settings. The ablation analysis show that the embeddings generated using spatial relations and the trajectory data together play an important role to tackle the problem.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
receiving, by one or more hardware processors, a target object to be reached by a mobile robot in an indoor environment, wherein the indoor environment comprises a plurality of regions, wherein each of the plurality of regions is associated with a plurality of objects; and
iteratively performing till the mobile robot reaches the target object:
identifying, by the one or more hardware processors, a current location of the mobile robot based on a plurality of visible regions among the plurality of regions around the mobile robot using a localization technique;
computing, by the one or more hardware processors, an embedding corresponding to each of the plurality of visible regions based on the current location of the mobile robot, a plurality of valid trajectory paths of the mobile robot and the target object, using a pretrained Graph Network (GNN), wherein the GNN is pretrained using trajectory data and a spatial relationship graph associated with the indoor environment, wherein the spatial relationship graph with a plurality of nodes and a plurality of edges is generated based on a spatial co-occurrence statistics data of the plurality of regions and the associated plurality of objects, by:
  generating the plurality of nodes by creating a node for each of the plurality of regions and each of the plurality of objects corresponding to each of the plurality of regions;
  generating the plurality of edges by creating (i) an edge between each of the plurality of regions and the plurality of objects associated with each of the plurality of regions and (ii) an edge between each of the plurality of regions;
  obtaining a spatial co-occurrence weight for each of the plurality of edges based on a frequency statistics data, wherein the spatial co-occurrence weight for each of the plurality of edges between each of the plurality of regions and each of the corresponding plurality of objects is obtained by:
    obtaining a frequency of occurrence of each of the plurality of objects corresponding to each of the plurality of regions; and
    computing the spatial co-occurrence weight by normalizing the frequency of occurrence of each of the plurality of objects based on a corresponding frequency of occurrence of the region associated with each of the plurality of objects; and
  updating the obtained spatial co-occurrence weight for each of the plurality of edges of the spatial relationship graph;
computing, by the one or more hardware processors, a similarity score for each of the plurality of visible regions based on the corresponding embedding, using a scoring technique;
identifying, by the one or more hardware processors, an optimal visible region from the plurality of visible regions by comparing the similarity score corresponding to each of the plurality of visible regions, wherein the visible region with a maximum similarity score from among the plurality of visible regions is identified as the optimal visible region; and
selecting, by the one or more hardware processors, a next action to be taken by the mobile robot from a plurality of actions based on the optimal visible region, wherein the mobile robot moves towards the optimal visible region and checks whether it is able to view the target object after reaching the optimal visible region.

2. The processor implemented method of claim 1, wherein the GNN is pretrained based on the trajectory data and the spatial relationship graph by:
  receiving a plurality of Matterport 3D scenes associated with the indoor environment, wherein each of the plurality of Matterport 3D scenes comprises the plurality of regions and the plurality of objects corresponding to each of the plurality of regions, wherein each of the plurality of objects are associated with a plurality of instances;
  generating a plurality of trajectory paths between each of the plurality of regions and each of the plurality of objects corresponding to each of the plurality of regions based on planned traversals of the mobile robot;
  generating the plurality of valid trajectory paths by identifying a plurality of shortest trajectory paths from the plurality of trajectory paths; and
  training the GNN based on the spatial relationship graph and the plurality of valid trajectory paths until a minimum cross entropy loss is obtained.

3. The processor implemented method of claim 2, wherein obtaining the spatial co-occurrence weight for each of the plurality of edges between each of the plurality of regions comprises:
  obtaining a total number of adjacent occurrences of each of a plurality of region pairs from the plurality of regions;
  obtaining a corresponding minimum frequency of occurrence for each of the plurality of region pairs; and
  computing the spatial co-occurrence weight by dividing the total number of adjacent occurrences of each of the plurality of region pairs by the corresponding minimum frequency of occurrence.

4. A system comprising:
at least one memory storing programmed instructions; one or more Input/Output (I/O) interfaces; and one or more hardware processors operatively coupled to the at least one memory, wherein the one or more hardware processors are configured by the programmed instructions to:
  receive a target object to be reached by a mobile robot in an indoor environment, wherein the indoor environment comprises a plurality of regions, wherein each of the plurality of regions is associated with a plurality of objects; and
  iteratively perform till the mobile robot reaches the target object:
    identifying a current location of the mobile robot based on a plurality of visible regions among the plurality of regions around the mobile robot using a localization technique;
    computing an embedding corresponding to each of the plurality of visible regions based on the current location of the mobile robot, a plurality of valid trajectory paths of the mobile robot and the target object, using a pretrained Graph Network (GNN), wherein the GNN is pretrained using trajectory data and a spatial relationship graph associated with the indoor environment, wherein the spatial relationship graph with a plurality of nodes and a plurality of edges is generated based on a spatial co-occurrence statistics data of the plurality of regions and the associated plurality of objects, by:
      generating the plurality of nodes by creating a node for each of the plurality of regions and each of the plurality of objects corresponding to each of the plurality of regions;
      generating the plurality of edges by creating (i) an edge between each of the plurality of regions and the plurality of objects associated with each of the plurality of regions and (ii) an edge between each of the plurality of regions;
      obtaining a spatial co-occurrence weight for each of the plurality of edges based on a frequency statistics data, wherein the spatial co-occurrence weight for each of the plurality of edges between each of the plurality of regions and each of the corresponding plurality of objects is obtained by:
        obtaining a frequency of occurrence of each of the plurality of objects corresponding to each of the plurality of regions; and
        computing the spatial co-occurrence weight by normalizing the frequency of occurrence of each of the plurality of objects based on a corresponding frequency of occurrence of the region associated with each of the plurality of objects; and updating the obtained spatial co-occurrence weight for each of the plurality of edges of the spatial relationship graph;

computing a similarity score for each of the plurality of visible regions based on the corresponding embedding, using a scoring technique;

identifying an optimal visible region from the plurality of visible regions by comparing the similarity score corresponding to each of the plurality of visible regions, wherein the visible region with a maximum similarity score from among the plurality of visible regions is identified as the optimal visible region; and selecting a next action to be taken by the mobile robot from a plurality of actions based on the optimal visible region, wherein the mobile robot moves towards the optimal visible region and checks whether it is able to view the target object after reaching the optimal visible region.

5. The system of claim 4, wherein the GNN is pretrained based on the trajectory data and the spatial relationship graph comprises by:

receiving a plurality of Matterport 3D scenes associated with the indoor environment, wherein each of the plurality of Matterport 3D scenes comprises the plurality of regions and the plurality of objects corresponding to each of the plurality of regions, wherein each of the plurality of objects are associated with a plurality of instances;

generating a plurality of trajectory paths between each of the plurality of regions and each of the plurality of objects corresponding to each of the plurality of regions based on planned traversals of the mobile robot;

generating the plurality of valid trajectory paths by identifying a plurality of shortest trajectory paths from the plurality of trajectory paths;

training the GNN based on the spatial relationship graph and the plurality of valid trajectory paths until a minimum cross entropy loss is obtained.

6. The system of claim 5, wherein obtaining the spatial co-occurrence weight for each of the plurality of edges between each of the plurality of regions comprises:

obtaining a total number of adjacent occurrences of each of a plurality of region pairs from the plurality of regions;

obtaining a corresponding minimum frequency of occurrence for each of the plurality of region pairs; and computing the spatial co-occurrence weight by dividing the total number of adjacent occurrences of each of the plurality of region pairs by the corresponding minimum frequency of occurrence.

7. One or more non-transitory machine readable information storage mediums comprising one or more instructions which when executed by one or more hardware processors cause the one or more hardware processors to perform operations comprising:

receiving a target object to be reached by a mobile robot in an indoor environment, wherein the indoor environment comprises a plurality of regions, wherein each of the plurality of regions is associated with a plurality of objects; and iteratively performing till the mobile robot reaches the target object:

identifying a current location of the mobile robot based on a plurality of visible regions among the plurality of regions around the mobile robot using a localization technique;

computing an embedding corresponding to each of the plurality of visible regions based on the current location of the mobile robot, a plurality of valid trajectory paths of the mobile robot and the target object, using a pretrained Graph Network (GNN), wherein the GNN is pretrained using trajectory data and a spatial relationship graph associated with the indoor environment, wherein the spatial relationship graph with a plurality of nodes and a plurality of edges is generated based on a spatial co-occurrence statistics data of the plurality of regions and the associated plurality of objects, by:

generating the plurality of nodes by creating a node for each of the plurality of regions and each of the plurality of objects corresponding to each of the plurality of regions;

generating the plurality of edges by creating (i) an edge between each of the plurality of regions and the plurality of objects associated with each of the plurality of regions and (ii) an edge between each of the plurality of regions;

obtaining a spatial co-occurrence weight for each of the plurality of edges based on a frequency statistics data, wherein the spatial co-occurrence weight for each of the plurality of edges between each of the plurality of regions and each of the corresponding plurality of objects is obtained by:

obtaining a frequency of occurrence of each of the plurality of objects corresponding to each of the plurality of regions; and computing the spatial co-occurrence weight by normalizing the frequency of occurrence of each of the plurality of objects based on a corresponding frequency of occurrence of the region associated with each of the plurality of objects; and updating the obtained spatial co-occurrence weight for each of the plurality of edges of the spatial relationship graph;

computing a similarity score for each of the plurality of visible regions based on the corresponding embedding, using a scoring technique;

identifying an optimal visible region from the plurality of visible regions by comparing the similarity score corresponding to each of the plurality of visible regions, wherein the visible region with a maximum similarity score from among the plurality of visible regions is identified as the optimal visible region; and selecting a next action to be taken by the mobile robot from a plurality of actions based on the optimal visible region, wherein the mobile robot moves towards the optimal visible region and checks whether it is able to view the target object after reaching the optimal visible region.

8. The one or more non-transitory machine readable information storage mediums of claim 7, wherein the GNN is pretrained based on the trajectory data and the spatial relationship graph by:

receiving a plurality of Matterport 3D scenes associated with the indoor environment, wherein each of the plurality of Matterport 3D scenes comprises the plurality of regions and the plurality of objects corresponding to each of the plurality of regions, wherein each of the plurality of objects are associated with a plurality of instances;

generating a plurality of trajectory paths between each of the plurality of regions and each of the plurality of objects corresponding to each of the plurality of regions based on planned traversals of the mobile robot;

generating the plurality of valid trajectory paths by identifying a plurality of shortest trajectory paths from the plurality of trajectory paths; and training the GNN based on the spatial relationship graph and the plurality of valid trajectory paths until a minimum cross entropy loss is obtained.

9. The one or more non-transitory machine readable information storage mediums of claim 8, wherein obtaining the spatial co-occurrence weight for each of the plurality of edges between each of the plurality of regions comprises:

obtaining a total number of adjacent occurrences of each of a plurality of region pairs from the plurality of regions;

obtaining a corresponding minimum frequency of occurrence for each of the plurality of region pairs; and computing the spatial co-occurrence weight by dividing the total number of adjacent occurrences of each of the plurality of region pairs by the corresponding minimum frequency of occurrence.

\* \* \* \* \*